Dec. 13, 1949     W. A. HORTHY     2,491,180
OIL FILTER
Filed July 17, 1944
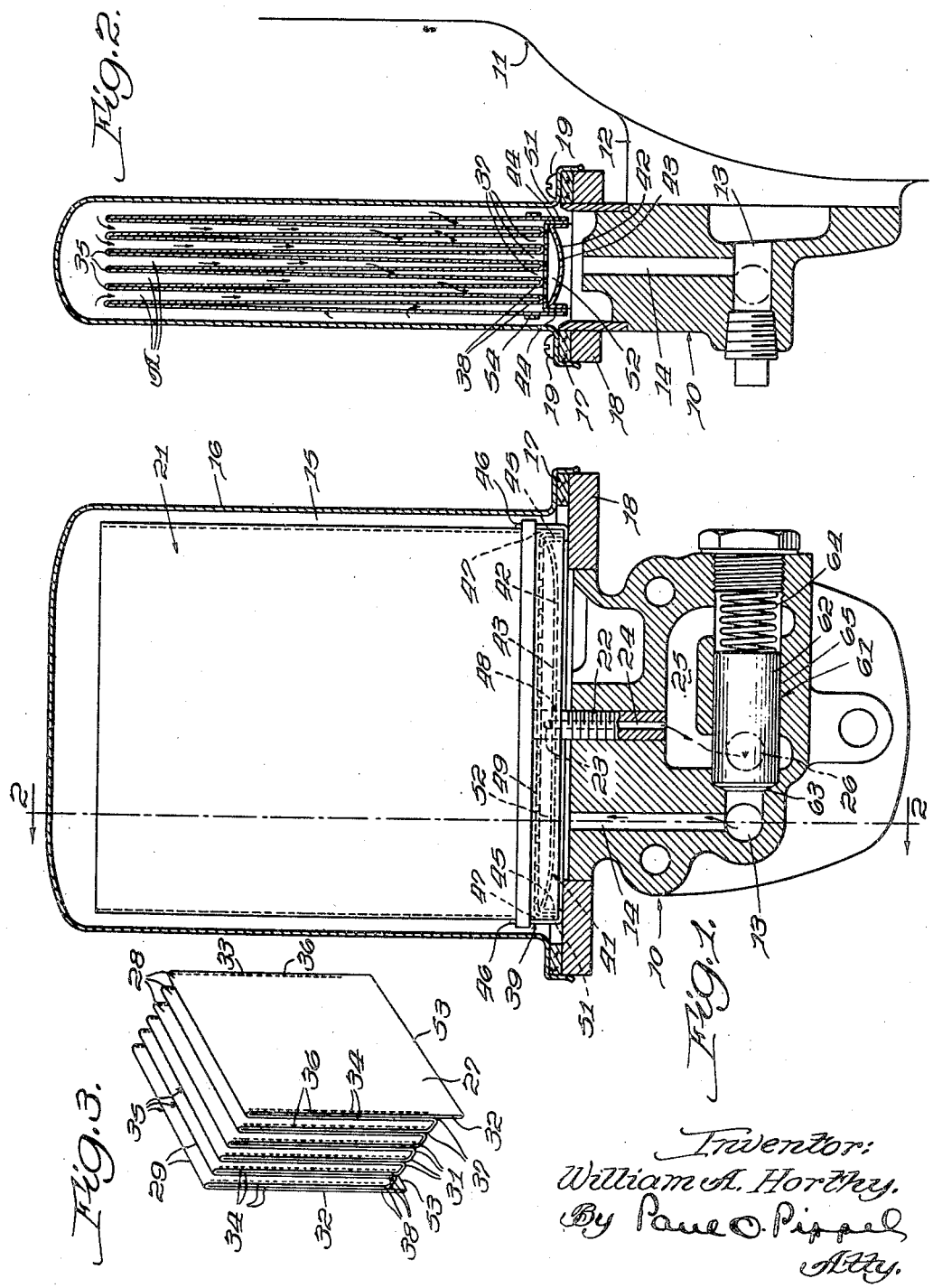
Inventor:
William A. Horthy.
By Paul O. Pippel
Atty.

Patented Dec. 13, 1949

2,491,180

UNITED STATES PATENT OFFICE 2,491,180

OIL FILTER

William A. Horthy, Chicago, Ill., assignor to International Harvester Company, a corporation of New Jersey Application July 17, 1944, Serial No. 545,240

2 Claims. (Cl. 210—169)

This invention has to do with filters and relates more particularly to an economically-produced replaceable filter structure employing a filtering sheet shaped to effectively utilize a large area and filtering surface thereof within a relatively small volumetric space. The invention concerns that class of filter disclosed in U. S. Patent No. 2,352,300, namely, wherein a thin sheet of normally frail material, such as wood fiber paper, embodies opposed filtering envelope walls which are compressed each against the other to avoid rupture when subjected to pressure of the fluid being filtered.

The general object of this invention is the provision of a novel shaped element wherein the filtering envelopes are susceptible of formation from a single flat sheet plaited to form the side walls of the envelopes and preferably stitched or otherwise treated at the ends of said plaits to cause the envelopes to be closed on three of their sides while being open on the fourth side for the discharge of liquid filtered inwardly through the envelope walls.

The above and other desirable objects inherent in and encompassed by the invention will be more clearly understood from the ensuing specification with reference to the annexed single sheet of drawings, wherein:

Fig. 1 is a vertical sectional view taken through a filter casing and showing therein, in side elevation, a filter unit embodying a preferred form of the invention;

Fig. 2 is also a vertical sectional view, taken on the line 2—2 of Fig. 1 and illustrating the filter structure in cross-section; and Fig. 3 is a perspective view of the folded filtering sheet embodied in the filtering structure or unit in condition for assembly with the base portion of such unit.

With continued reference to the drawings, Figs. 1 and 2 illustrate a filter casing base 10 secured to a boss 11 on the crank case 12 of an internal combustion engine. An oil conduit 13 within the base 10 communicates with the discharge side of the lubricating oil pump (not shown) of the engine. Oil from the conduit 13 leads upwardly through a passage 14 into the interior of the casing 15 bounded by an inverted cup-like casing cover member 16 and the casing base 10. A gasket 17 is provided between the lower perimeter of the cover member 16 and a peripheral flange 18 upon the base 10. A plurality of machine screws 19 are preferably employed for retaining the cover member 16 upon the base.

A return line for the filtered oil after it has passed through the filter unit 21, as will be explained more fully hereinafter, includes a conduit member or tube 22 threaded into the base 10 and having a lateral entrance 23 for the filtered oil and a bore 24 communicating with a channel 25 within the base 10. A discharge conduit 26 communicates between the channel 25 and lubrication delivery channels (not shown) within the engine.

The filtering unit 21 comprises a strip 27 of thin, pliant, porous filtering material, such as wood pulp paper. When the sheet or strip 27 is made of wood pulp paper, it will be treated to cause the wood fibers to be individually enveloped and/or penetrated with a water-repellant material, whereby the porosity of the strip is preserved yet these matted fibers will not become loosened and the sheet weakened by water which is sometimes found in oil or other liquids to be filtered. The sheet may be subjected to a water proofing process as that disclosed in U. S. Patent No. 2,103,572 to Donald H. Wells. Such process involves the steps of immersing the paper strip in a solution of thermo-setting plastic (phenol-formaldehyde resin) and a solvent and thereafter heating the treated sheet for obtaining polymerization of the plastic.

A plurality of plaits 28 are formed in the sheet 27 by folding it upon parallel laterally spaced sections as 29 and 31 extending transversely between opposite edges 32 and 33 of the sheet. Each of these plaits 28 has a pair of opposed sides which form the side walls 34 of filtering envelopes 35. Opposite ends of the plaits 28 are closed by some suitable fastening means, such as stitching 36 along opposite edges of the sheet, for fastening end portions of the paired plait walls in a pressed-together condition and thus converting the plaits 28 into said envelopes or pockets 35. An adhesive sealing means may be employed in conjunction with the stitching 36 or in lieu thereof if desired. Such adhesive means may be in the form of an adhesive disposed between the envelope side walls at narrow zones extending along their opposite ends, or such adhesive means may be in the form of a sheet of adhesive-covered material applied flatly to the ends of the envelope walls. That is, a flat sheet with an adhesive coating thereon could be applied commonly against the ends of the envelope walls exposed in Fig. 3 and a single flat sheet similarly applied to the opposite ends of these envelopes. Each envelope 35, therefore, consists of a pocket of which the upper edge, as viewed in Figs. 2 and 3, is formed integrally with its two walls 34 and of which the ends are closed by stitching 36. The lower or root edges 38 remain in detached contiguity for forming openings 37 through which liquid filtered into the envelopes through their side walls 34 is discharged.

Subsequent to the formation of this series of filtering envelopes as illustrated in Fig. 3, this subassembly is next assembled with a base 39 of the filtering unit or structure. This base 39 comprises a bottom plate 41 having a rectangular crown-like bridge 42 provided with a concave top 43 from which depend side flanges 44, Fig. 2, and end flanges 45, Fig. 1. Upwardly turned end portions 46 of the plate 41 are spaced from the downwardly turned flanges 45 and are connected therewith at their lower ends, forming grooves 47 between said end portions 46 and said downwardly turned flanges 45. A center portion of the bridge top 43 has an opening 48 for receiving the upper end of the tube 22. A peripherally flanged perforated plate 49 is inverted over the crown-like bridge 42 with a down-turned flange 51 upon this perforated plate snugly engaging the flanges 44 and 45 of the crown-like bridge 42 to effect a chamber 52 between the members 41 and 49. This pocket is for registering with the lateral intake passage 23 in the discharge tube within the casing base 10.

In assembling the filtering sheet portion of the filtering unit with the base 39, the two downwardly extending edges 53 of the outer walls of the endmost envelopes 35 are laid alongside the two opposite longer sides of the flange 51 of the perforated plate 49 as illustrated in Fig. 2. The ends of the envelope walls at their root ends are embraced by the upturned end portions 46 of the filter unit base, and tight frictional engagement is obtained and maintained between these upturned portions 46 and the ends of the envelope side walls by a metal band 54 extending completely about the unit.

In the operation of the device, oil forced into the base 10 through the conduit 13 and flowing upwardly through the passage 14 into the casing member 15 completely fills the chamber and the spaces A between the exterior sides of adjacent envelopes 35. Thus, uniform pressure of the oil is applied over the entire exterior surface of these envelopes, tending to collapse the same. Complete collapse of the envelopes may be prevented by selecting sheet material from which they are made having a roughened surface, so that interstitial drainage passages will exist between the opposed inner surfaces of the envelope walls permitting the oil seeping or filtering through these walls to drain downwardly and outwardly through the openings 37. If desired, spacing elements such as wire fabric may be inserted into the envelopes for preventing complete collapse of the walls to such an extent that they would become sealed and prevent the escape of the oil filtering therethrough. It is preferred, however, to employ a roughened or rippled surface sheet since the spacer screens add to the cost of materials and labor in the unit and furthermore add to its bulk. It is desirable to leave a predetermined space between adjacent envelopes for the accumulation of the filtration residue, and when it is observed that this space is accumulative with that required for wire fabric spacer elements within the envelopes, it will be apparent that the space required by such spacer elements is significant.

The oil filtering through the envelope walls in the manner indicated by the arrows in Fig. 2, after discharging from the envelope openings 37, passes through the perforated plate into the pocket 52 of the filter unit base, thence through the casing discharge passage 23, channels 24 and 25, and conduit 26 into the engine lubrication passages (not shown).

Excepting when the unfiltered fluid in the casing is under pressure, the envelope formation consisting of the envelopes 35 is capable of self-support in the vertical direction. That is, the root portions 38 of these walls have no tendency to sag. Upon the creation of the fluid or oil pressure in the casing chamber 15, however, the pressure tends to force the lower ends of the envelope walls downwardly, but this is prevented by the perforate plate 49 which serves as a brace means therefor. Support for the mid-section of the perforate plate 49 is provided by the upper end of the discharge duct stem 22 which abuts the lower end of said plate.

Excessive pressure within the casing chamber 15 is prevented by a by-pass valve 61 consisting of a spring pressed plunger 62 urged against a seat 63 by a spring 64. This plunger 62 is slidable within a bearing 65 formed in the base 10. Upon the pressure within the conduit 13 and hence in the casing chamber 15 attaining a predetermined maximum pressure, the plunger 62 will be forced to the right and permit by-passing into the channel 25 and thence directly to the lubricating channels of the engine through the conduit 26.

I claim:

1. A discardable and replaceable filter unit, comprising a pliable filtering sheet folded at laterally spaced sections to produce therefrom a series of correspondingly spaced plaits each having a pair of contiguously opposed side walls and respective narrow discharge openings formed between the root edges of their respective side walls and communicating with space at one side of the sheet, and means fastening end portions of the paired walls in a pressed-together condition to form a pocket of each plait and to maintain the side walls in the state of opposed contiguity.

2. A discardable and replaceable filter unit, comprising a pliable filtering sheet folded at laterally spaced sections to produce therefrom a series of correspondingly spaced plaits each having a pair of contiguously opposed side walls and respective narrow discharge openings formed between the root edges of their respective side walls and communicating with space at one side of the sheet, means fastening end portions of the paired walls in a pressed-together condition to form a pocket of each plait and to maintain the side walls in the state of opposed contiguity, and a base structure containing a chamber for filtered fluid and a perforate wall forming a side of said chamber, said base structure being assembled with the plaited sheet with said perforate wall in supporting relation with said side of said sheet at the portions thereof between the plaits, and said perforate wall providing communication between said discharge openings and said chamber.

WILLIAM A. HORTHY.

REFERENCES CITED

The following references are of record in the file of this patent:

UNITED STATES PATENTS

| Number | Name | Date |
|---|---|---|
| 1,651,400 | McKinley | Dec. 6, 1927 |
| 2,337,574 | Sloan et al. | Dec. 28, 1943 |
| 2,352,300 | Walker et al. | June 27, 1944 |

FOREIGN PATENTS

| Number | Country | Date |
|---|---|---|
| 255,086 | France | Nov. 7, 1902 |
| 9,421 | France | Aug. 19, 1908 |
| | (Addition to No. 370,467) | |
| 401,287 | Great Britain | Oct. 30, 1933 |
| 803,101 | France | June 29, 1936 |